U S009218467B2

United States Patent
Matthews et al.

(10) Patent No.: US 9,218,467 B2
(45) Date of Patent: Dec. 22, 2015

(54) INTRA STACK FRAME RANDOMIZATION FOR PROTECTING APPLICATIONS AGAINST CODE INJECTION ATTACK

(71) Applicant: Raytheon BBN Technologies, Corp., Cambridge, MA (US)

(72) Inventors: David Matthews, Ellicott City, MD (US); Robert Martz, Laurel, MD (US)

(73) Assignee: RAYTHEON CYBER PRODUCTS, LLC, Herndon, VA (US)

( * ) Notice: Subject to any disclaimer, the term of this patent is extended or adjusted under 35 U.S.C. 154(b) by 91 days.

(21) Appl. No.: 13/905,122

(22) Filed: May 29, 2013

(65) Prior Publication Data

US 2014/0359773 A1    Dec. 4, 2014

(51) Int. Cl.
| | | |
|---|---|---|
| *G06F 21/12* | (2013.01) | |
| *G06F 21/52* | (2013.01) | |
| *G06F 21/54* | (2013.01) | |
| G06F 12/14 | (2006.01) | |
| G06F 21/14 | (2013.01) | |
| G06F 12/16 | (2006.01) | |

(52) U.S. Cl.
CPC .............. *G06F 21/125* (2013.01); *G06F 21/52* (2013.01); *G06F 21/54* (2013.01); *G06F 12/14* (2013.01); *G06F 12/1441* (2013.01); *G06F 12/16* (2013.01); *G06F 21/14* (2013.01)

(58) Field of Classification Search
CPC ......... G06F 21/14; G06F 12/14; G06F 12/16; G06F 12/1441
USPC .......................................................... 726/24
See application file for complete search history.

(56) References Cited

U.S. PATENT DOCUMENTS

| | | | | |
|---|---|---|---|---|
| 6,578,094 | B1 * | 6/2003 | Moudgill ............... | G06F 7/785 710/40 |
| 7,945,953 | B1 * | 5/2011 | Salinas ............... | G06F 12/1441 726/22 |
| 2002/0016918 | A1 * | 2/2002 | Tucker et al. ................. | 713/190 |
| 2005/0183072 | A1 * | 8/2005 | Horning et al. ............... | 717/140 |
| 2007/0039048 | A1 * | 2/2007 | Shelest et al. .................. | 726/22 |
| 2008/0016314 | A1 * | 1/2008 | Li ........................ | G06F 21/554 711/200 |
| 2010/0082945 | A1 | 4/2010 | Adachi et al. | |
| 2012/0173497 | A1 | 7/2012 | Devalla et al. | |

(Continued)

FOREIGN PATENT DOCUMENTS

WO      00/39956      6/2000

OTHER PUBLICATIONS

James C. Foster; Buffer Overflow Attacks: Detect, Exploit, Prevent; Feb. 2005, Syngress, Chapter 5—Stack Overflows, Summary, pp. 202-203; downloaded from http://techbus.safaribooksonline.com/book/web-development/1932266674 on Sep. 15, 2015.*

(Continued)

Primary Examiner — Chau Le
Assistant Examiner — Gary Lavelle
(74) Attorney, Agent, or Firm — Christie, Parker & Hale, LLP

(57) ABSTRACT

A method of randomizing locations of variables in a stack includes: identifying a plurality of stack locations corresponding to a plurality of variables; shuffling the stack locations of the variables to produce shuffled stack locations; and updating the stack locations of the variables with the shuffled stack locations.

18 Claims, 7 Drawing Sheets

(56) References Cited

U.S. PATENT DOCUMENTS

2012/0204039 A1* 8/2012 Farrugia et al. ............... 713/190
2012/0260106 A1 10/2012 Zaks et al.

OTHER PUBLICATIONS

Yang-Seo Choi, Dong-il Seo and Sung-Won Sohn; A New Stack Buffer Overflow Hacking Defense Technique with Memory Address Confirmation; 2002, Springer-Verlag Berlin Heidelberg 2002, pp. 1-14, downloaded from http://link.springer.com/chapter/10.1007%2F3-540-45861-1_12 on Sep. 15, 2015.*

Chew, Monica, and Song, Dawn. "Mitigating buffer overflows by operating system randomization." Technical Report CMU-CS-02-197, Carnegie Mellon University, Dec. 2002, 11 pages.

Crispin Cowan, et al. "StackGuard: Automatic Adaptive Detection and Prevention of Buffer-Overflow Attacks." *Proceedings of the 7th USENIX Security Symposium* (Jan. 26-29, 1998). 15 pages.

Haugh, Eric and Bishop, Matt. "Testing C Programs for Buffer Overflow Vulnerabilities." *In Proceedings of the Network and Distributed System Security Symposium*, 2003, 8 pages.

Shacham, Hovav, et al. "On the effectiveness of address-space randomization." *Proceedings of the 11th ACM conference on Computer and communications security*. ACM, 2004, 10 pages.

Whitehouse, Ollie. "An analysis of address space layout randomization on Windows Vista." *Symantec advanced threat research* (2007): 1-14.

Forrest, "Building Diverse Computer Systems", Operating Systerns, 1997, The Sixth Workshop On Hot Topics in Cape Cod, MS, USA, May 5-6 1997, Los Alamitos, CA, USA, IEEE Comput. Soc. US, May 5, 1997 (p. 67-72).

Written Opinion of the International Searching Authority for international Application No. PCT/US2014/031687, filed Mar. 25, 2014, Written Opinion of the International Searching Authority mailed Jul. 10, 2014 (6 pgs.).

International Search Report for International Application No. PCT/US2014/031687, filed Mar. 25, 2014, International Search Report dated Jul. 1, 2014 and mailed Jul. 10, 2014 (4 pgs.).

Barrantes, Elena Gabriela, et al. "Randomized instruction set emulation." *ACM Transactions on Information and System Security (TISSEC)* 8.1 (2005): 3-40.

Kc, Gaurav S., et al. "Countering code-injection attacks with instruction-set randomization." *Proceedings of the 10th ACM conference on Computer and communications security*. ACM, 2003, pp. 272-280.

* cited by examiner

INTRA STACK FRAME RANDOMIZATION FOR PROTECTING APPLICATIONS AGAINST CODE INJECTION ATTACK

STATEMENT REGARDING FEDERALLY SPONSORED RESEARCH OR DEVELOPMENT

This invention disclosure is related to Government Contract No. FA8750-12-C-0098. The Government has certain rights in this invention.

BACKGROUND

Aspects of embodiments of the present invention relate to the field of computer security, and, more specifically, protection against code injection attacks.

Stack-based code injection attacks using buffer overflows are a common security risk in computer systems. In a buffer overflow attack, input data supplied by an attacker to a function (subroutine, method, procedure, or other callable unit) exceeds the size of the space allocated for that input (the "buffer"). If the computer system fails to check the size of the input data before writing the input data into the buffer, then the buffer "overflows" and data stored in portions of memory outside of the buffer can be corrupted.

FIG. 1 is a schematic diagram of a typical computer system. In a standard computer system, a central processing unit (CPU) 10 includes a program counter (PC) 12, a plurality of registers 14, an arithmetic/logic unit (ALU) 16, and a bus interface 18. The program counter 12 provides the address of the next instruction to be executed, the registers 14 store data and values currently being computed, and the ALU 16 performs computations on the data stored in the registers 14. Data is transferred into and out of the CPU 10 via the bus interface 18, which interfaces with an I/O bridge 20 to communicate with main memory 30 and other peripheral devices 40. While FIG. 1 illustrates a typical computer system, various other computer systems may be organized in different ways (for example, the I/O bridge 20 may be integrated into the CPU 10, or the CPU may include memory caches).

FIG. 2 is a schematic diagram illustrating a stack smashing buffer overflow attack. C. Cowan, et al., *StackGuard: Automatic Adaptive Detection and Prevention of Buffer-Overflow Attacks* 7 PROC. OF USENIX SEC. SYMP. (1998). As seen in FIG. 2, the stack 100 is stored in main memory 30 and grows in a downward direction (e.g., away from 0xFFFF and toward 0x0000). When a function call is made, a "Return Address" is pushed onto the stack and space is allocated for local variables, including a potentially attackable buffer at lower addresses. When input data is stored the buffer, the data (e.g., a text string from user input) grows in an upward direction (with increasing addresses). If the size of the input data exceeds the allocated size of the buffer, data located at higher addresses than the buffer can be overwritten with the supplied data. In FIG. 2, for example, the data overflowing the buffer could overwrite the Local Variables, the return address, and portions of the stack above the return address (which is generally the portion of the stack allocated to the calling function).

As seen in FIG. 2, the overflowing buffer can be used to insert executable attack code into the stack and to overwrite the return address with a pointer to the attack code. As such, when the attacked function exits, the processor jumps to and executes the attack code instead of the function that it was called from. The attack code can be used to gain root (or administrator) access to the machine by, for example, executing the command 'exec("sh")' to produce a root shell.

Generally, stack-based code injection attacks require: knowledge of the instruction set of the underlying architecture; knowledge of the location of one or more buffers on the stack; ability to inject code/data; and ability to redirect the control flow. An attacker can use the stack to return to the injected or other arbitrary code.

For an attacker to successfully craft a payload for a stack-based code injection attack, they need to be aware of the stack layout of the function they are attacking. This is because they need to change a return address in a very specific place on the stack to successfully gain control of the system.

Historically the layout of layout of these local variables (including any buffers) is controlled by the compiler, and each compiler handles them differently. However, it is generally not difficult for an attacker to determine (or guess) which compiler was used. The layout of these local variables has no influence on the execution of the function, because they are typically referenced in the machine code as an immediate offset from the stack pointer.

Most modern operating systems use some form of address space layout randomization (ASLR), which will randomize the location of the entire stack. See, e.g., O. Whitehouse, *An Analysis of Address Space Layout Randomization on Windows Vista™*, Symantec Advanced Threat Research. While this can provide some benefit, this concept requires support in the underlying operating system, and it can be turned off via operating system settings, thereby rendering system vulnerable when deactivated by an attacker or deactivated by a system administrator (due, for example, to compatibility problems between "legacy" software and ASLR).

SUMMARY

According to one embodiment of the present invention, a method of randomizing locations of variables in a stack includes: identifying a plurality of stack locations corresponding to a plurality of variables; shuffling the stack locations of the variables to produce shuffled stack locations; and updating the stack locations of the variables with the shuffled stack locations.

The identifying the stack locations may include identifying variables in object code, and the updating the stack locations of the variables may include updating the object code with the shuffled stack locations.

The identifying the stack locations may include identifying variables in binary code, and the updating the stack locations of the variables may include updating the binary code with the shuffled stack locations.

The identifying the stack locations may include identifying variables in executable code loaded into memory, and the updating the stack locations of the variables may include updating the executable code loaded into memory with the shuffled stack locations.

The shuffling the stack locations of the variables to produce shuffled stack locations and the updating the stack locations of the variables with the shuffled stack locations may occur prior to execution of the executable code.

The shuffling the stack locations of the variables to produce shuffled stack locations and the updating the stack locations of the variables with the shuffled stack locations may occur during execution of the executable code.

According to one embodiment of the present invention, a non-transitory computer readable medium embodies program instructions for execution by a data processing apparatus, the program instructions adapting the data processing apparatus for: identifying a plurality of stack locations corresponding to a plurality of variables; shuffling the stack locations of the variables to produce shuffled stack locations; and updating the stack locations of the variables with the shuffled stack locations.

The identifying the stack locations may include identifying variables in object code, and the updating the stack locations of the variables may include updating the object code with the shuffled stack locations.

The identifying the stack locations may include identifying variables in binary code, and the updating the stack locations of the variables may include updating the binary code with the shuffled stack locations.

The identifying the stack locations may include identifying variables in executable code loaded into memory, and the updating the stack locations of the variables may include updating the executable code loaded into memory with the shuffled stack locations.

The shuffling the stack locations of the variables to produce shuffled stack locations and the updating the stack locations of the variables with the shuffled stack locations may occur prior to execution of the executable code.

The shuffling the stack locations of the variables to produce shuffled stack locations and the updating the stack locations of the variables with the shuffled stack locations may occur during execution of the executable code.

According to one embodiment of the present invention, a computer system includes a processor; and memory storing program instructions, the program instructions being configured to control the computer system to: identify a plurality of stack locations corresponding to a plurality of variables; shuffle the stack locations of the variables to produce shuffled stack locations; and update the stack locations of the variables with the shuffled stack locations.

The identifying the stack locations may include identifying variables in object code, and the updating the stack locations of the variables may include updating the object code with the shuffled stack locations.

The identifying the stack locations may include identifying variables in binary code, and the updating the stack locations of the variables may include updating the binary code with the shuffled stack locations.

The identifying the stack locations may include identifying variables in executable code loaded into memory, and the updating the stack locations of the variables may include updating the executable code loaded into memory with the shuffled stack locations.

The shuffling the stack locations of the variables to produce shuffled stack locations and the updating the stack locations of the variables with the shuffled stack locations may occur prior to execution of the executable code.

The shuffling the stack locations of the variables to produce shuffled stack locations and the updating the stack locations of the variables with the shuffled stack locations may occur during execution of the executable code.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
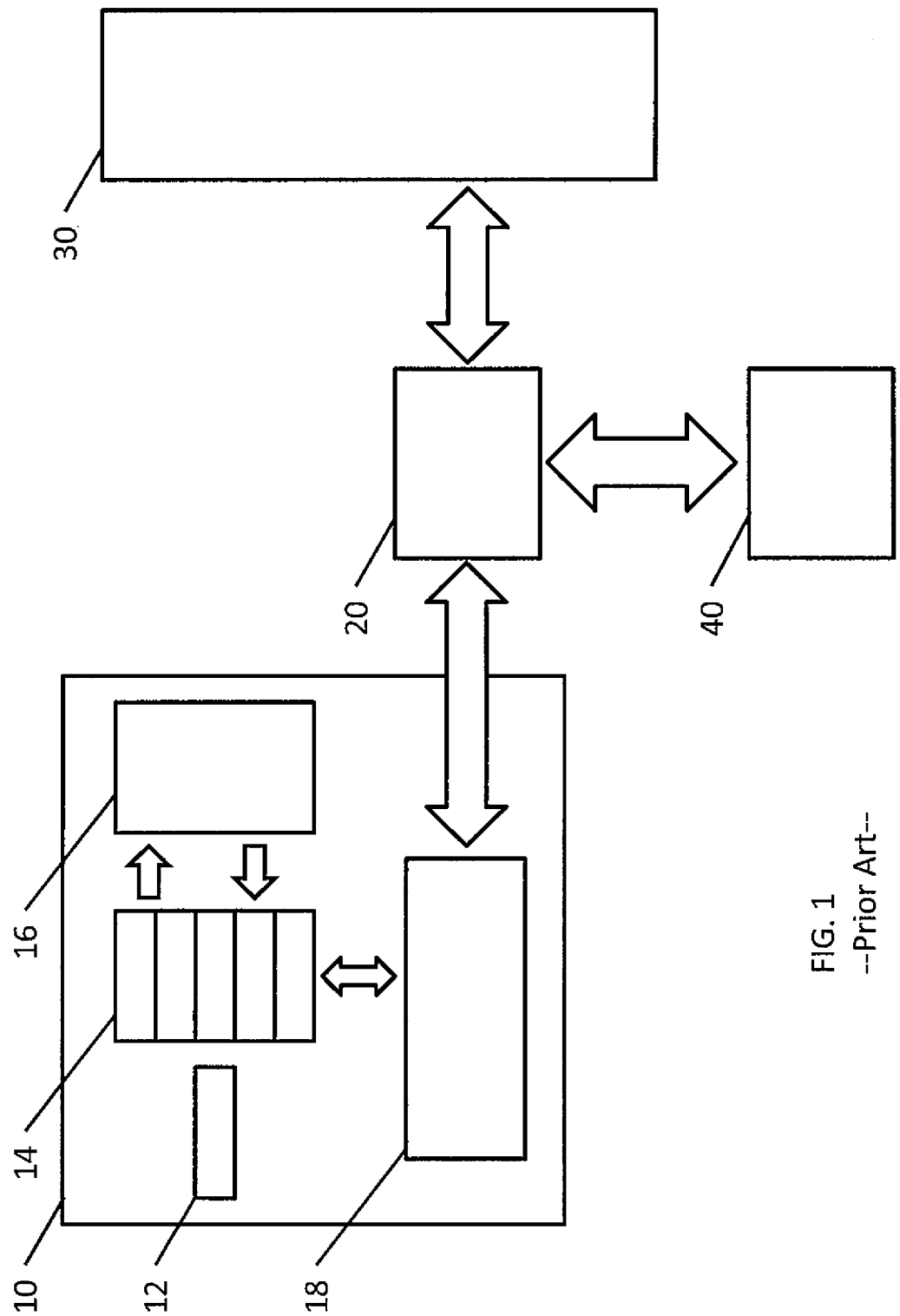
FIG. 1 is a schematic diagram of a typical computer system.
Figure 2:
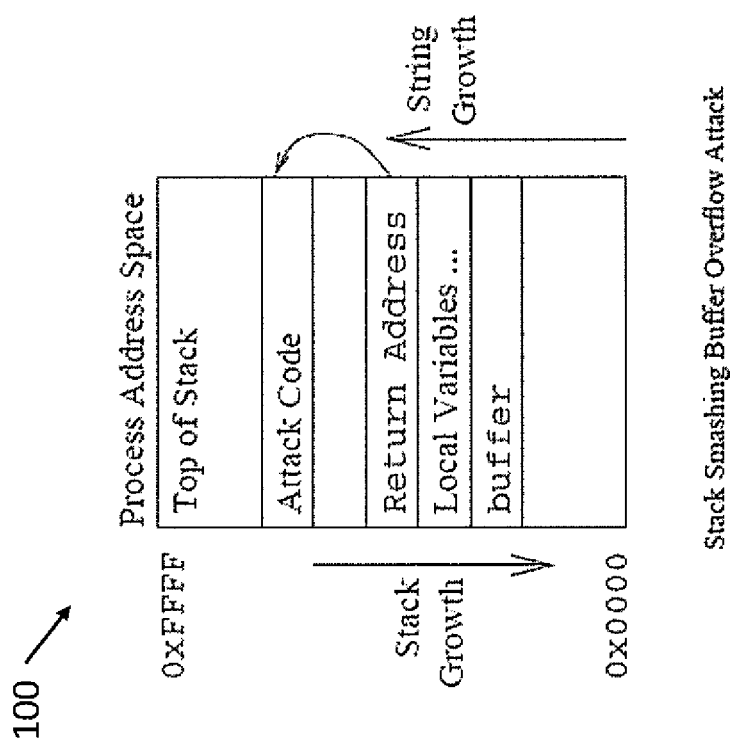
FIG. 2 is a schematic diagram illustrating a stack smashing buffer overflow attack.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Embodiments of the present invention are directed to methods, systems, and programs for improving the security of a computer system against code injection attacks by shuffling (or randomizing) the order of local function variables on the stack. Embodiments of the present invention may be implemented as a computer programmed in any of a number of programming languages such as x86 assembly, C, Python, and Java. Embodiments of the present invention may also be implemented as a computer program stored on a non-transitory computer readable medium embodying program instructions. Some embodiments of the present invention are directed to the method of performing the processes described below.

Figure 3:
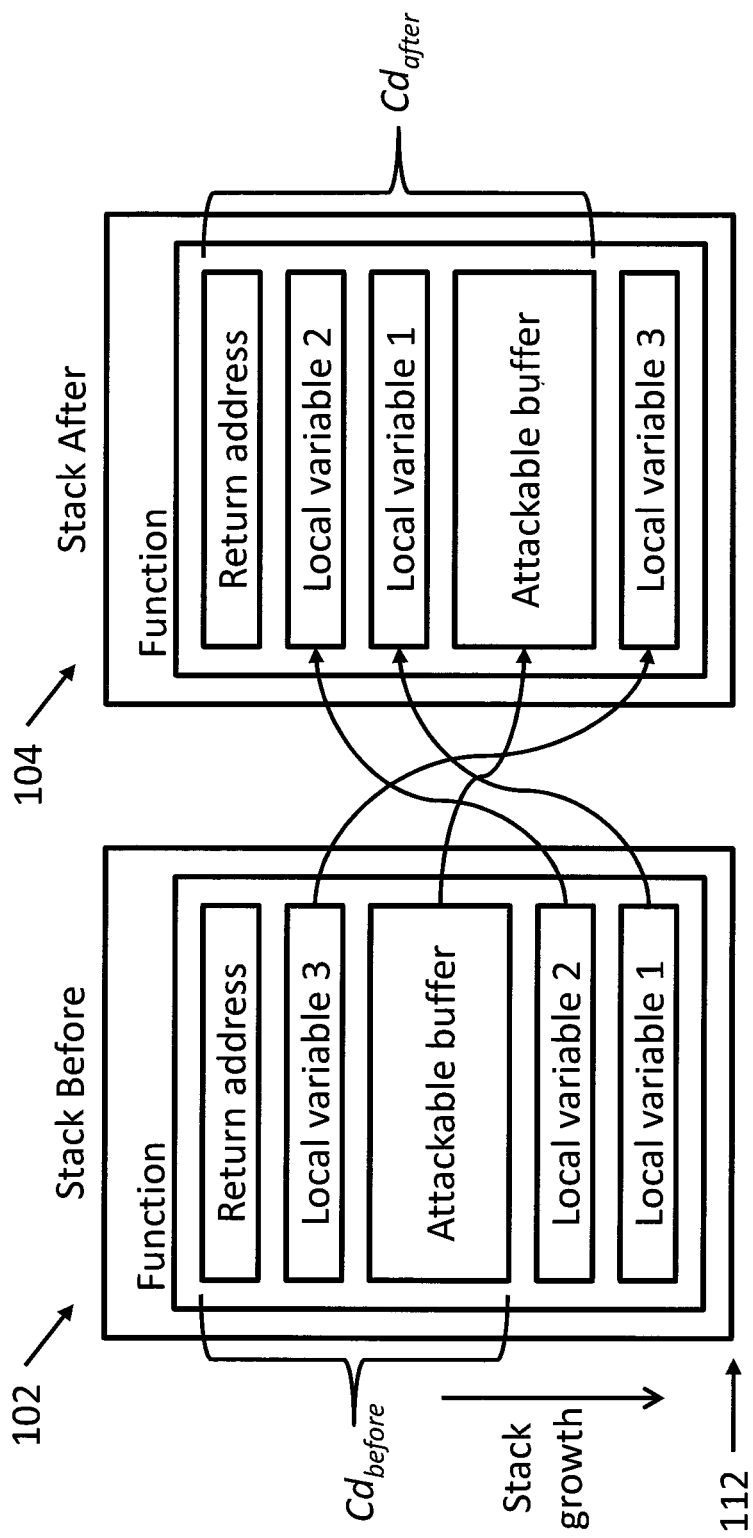
FIG. 3 is a schematic diagram of an exemplary stack before and after being shuffled in accordance with an embodiment of the present invention.

FIG. 3 is a schematic diagram of an exemplary stack before and after being shuffled in accordance with an embodiment of the present invention. Referring to FIG. 3, prior to stack randomization, the stack 102 includes (in order from the bottom of the stack toward the top of the stack 112): a return address, local variable 3, an attackable buffer, local variable 2, and local variable 1. In exemplary stack 102, there is a critical distance ($Cd_{before}$) between the return address and the address of the attackable buffer, where critical distance is the sum of the size of the local variable 3 and the size of the attackable buffer.

Stack 104 in FIG. 3 shows the stack after stack randomization. In stack 104, local variable 1 and local variable 2 are now located between the attackable buffer and the return address. As such, the critical distance ($Cd_{after}$) after shuffling is the sum of the size of local variables 1 and 2 and the attackable buffer. As such, the critical distance Cd between the attackable buffer and the return address is changed by the randomization process.

By randomizing this order within individual stack frames of a program, an attacker would not be able to know where an "attackable" buffer would be placed on the stack (the critical distance Cd), thereby providing additional security against stack-based exploits by frustrating or preventing an attacker's ability to craft an appropriate attack payload due to the uncertainty in the distance between the start of the buffer and the location of the return address on the stack. While code injection would not necessarily be prevented by such an arrangement, attempts to gain control of the system using such an attack would be limited.

Generally, an implementation of an embodiment of this invention would first identify the placement (or definition) of the local function variables on the stack within all the functions of a given program. This placement of variables has a fairly standard signature, and is usually located at the start of the machine code for a particular function. For example, according to one embodiment, instructions in a given function involving variables can be identified by their references to memory locations having addresses at fixed offsets from the frame pointer (fp) (e.g., load or store instructions using an immediate address or fixed offset from the fp), in accordance with the way in which these memory locations are identified in the architecture of the computer processor being used (e.g., ARM, x86, PowerPC, etc.).

References to those variables within each function are then identified. These variables are generally referenced using a fixed offset from the frame pointer. Once both the locations of the variables on the stack and all the references to the variables are known, their order (and locations) can be randomized.

For example, if a function makes use of local variables a and c which are located on the stack at fp−4 and fp−8 and buffer b is located at fp−72, then references to those three locations (fp−4, fp−8, and fp−72) would be searched for within the function body. The allocations of space and the references to those locations can then be shuffled (e.g., moving buffer b to fp−64 and local variables a and c to fp−68 and fp−72) by replacing each old reference to a location on the stack with the new, shuffled location on the stack.

Because only the order of the variables on the stack is changed, the size of the program and the amount of space used on the stack are not changed, and other address offsets do not need to be updated.

The extent of the randomization is dependent on the number of variables in a given function (more variables means more opportunities for reordering). Nevertheless, even a handful of local variables can result in an effective randomization. In addition, local variable randomization can run on the bare metal of the machine and can be built into the binary of the program, thereby making it more difficult to deactivate the variable randomization feature (in contrast to operating system-based ASLR protection).

Several embodiments of the present invention are described below. In one embodiment, this process is included in the build (or compilation) process, so that a new randomization is created at every compilation. In another embodiment, this process is run on a compiled binary application, so that the variable order will be different the next time an application is run. In a third embodiment, this process is incorporated into how the application is launched, so that the variable order is re-randomized every time an application is run. In a fourth embodiment, the randomization functionality is incorporated into an application itself, allowing it to re-randomize itself at intervals during execution. However, embodiments of the present invention are not limited thereto and may be implemented in a variety of other ways without departing from the scope of the invention.

Figure 4:
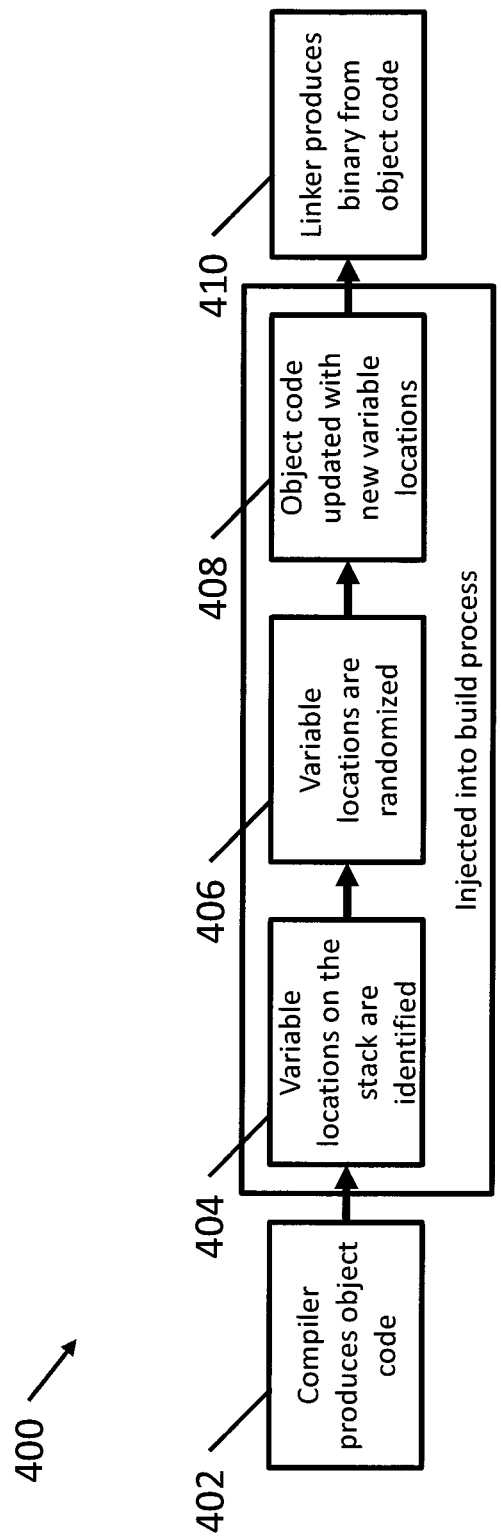
FIG. 4 is a process flow diagram illustrating a method of randomizing the locations of variables on the stack during a standard build process in accordance with one embodiment of the present invention.

FIG. 4 is a process flow diagram illustrating a method of randomizing the locations of variables on the stack during a standard build process in accordance with one embodiment of the present invention. In the method 400 shown in FIG. 4, after the compiler has produced object code in operation 402, the locations of the variables on the stack are identified in operation 404, the variable locations are randomized in operation 406, and the compiled object code is updated with new variable locations in operation 408. The updated compiled object code in then supplied to the linker to produce a binary from the updated object code in operation 410.

The compiler and the linker may be any standard compiler and linker such as GNU C Compiler (GCC C) and the GNU linker (GNU ld) or the LLVM Clang and LLVM lld. In other embodiments of the present invention, the method of shuffling the locations of variables in compiled object code before linking may be used with other compilers and linkers, in conjunction with the C programming language or any other appropriate programming language (e.g., languages susceptible to buffer over flow attacks).

According to one embodiment, variable locations on the stack can be identified in operation 404 as follows:

Generally, local variables are placed on the stack and referenced by a fixed offset from the frame pointer. For example:

str r3, [fp, #−8]

This instruction stores the value in register r3 into a local variable on the stack which, in this case, is 8 bytes from the frame pointer fp (fp−8). Throughout the function, this offset from the frame pointer will always refer to this variable, so it is easy to find these locations by looking for all locations that have this given offset (here, −8). Therefore, when the value stored in that local variable is used later in the function, the following instruction loads the value at the position of the local variable (fp−8) in the stack:

ldr r2, [fp, #−8]

This instruction places the value of that variable (the data stored at location fp−8 in the stack) into register r2.

In one embodiment, randomization of the variable locations in operation 406 is completed by changing the fixed offsets of all locations of the local variables in the function. For example, continuing with the above example, −8 could be replaced with another valid stack location (such as −12) such that the above instructions would become:

str r3, [fp, #−12]

and ldr r2, [fp, #−12]

Because the offsets for the local variables only have meaning within the function being randomized, the problem is well bounded (the randomization operation only needs to be concerned with the function currently being randomized).

The object code is then updated with the new variable locations in operation 408 by replacing instructions in the object code as described above. This operation can be done in object code because the offsets are relative to the frame pointer and no fixed addresses are used (fixed addresses are typically added during linking in operation 410). In other words, only the offsets relative to the frame pointer are modified during the update.

The above operations of identifying locations in the stack, randomizing the locations, and updating the binary can be repeated for every function in the compiled object code and, according to one embodiment, the above operations are performed by a computer program that takes the compiled object code as input and that outputs modified object code.

Figure 5:
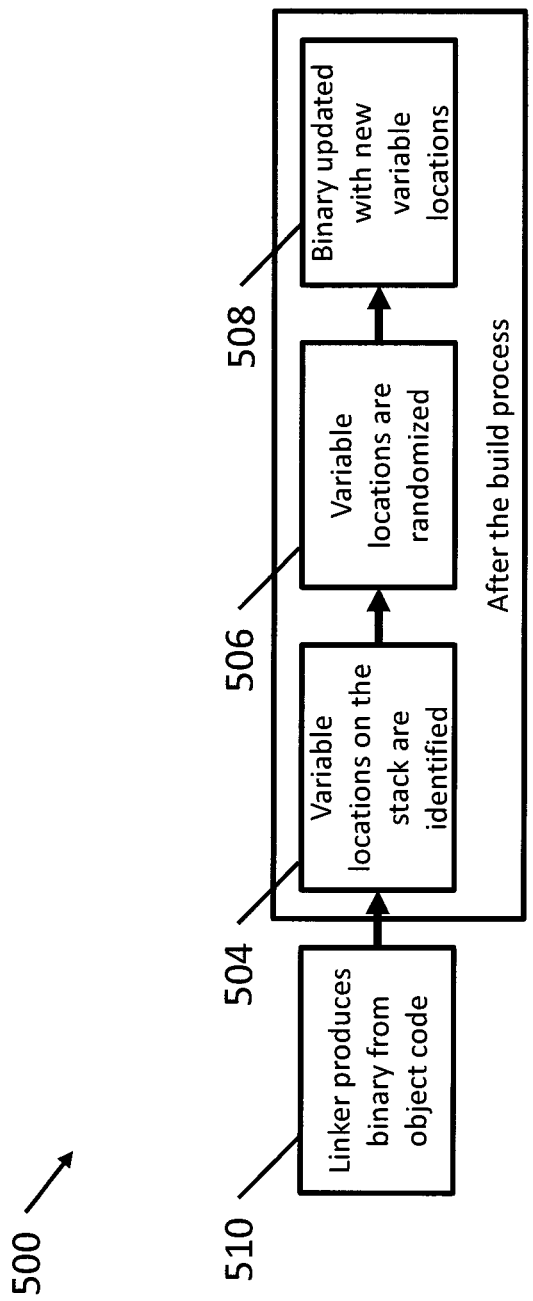
FIG. 5 is a process flow diagram illustrating a method of randomizing the locations of variables on the stack in a compiled and linked executable binary file (or binary) in accordance with one embodiment of the present invention.

In another embodiment of the present invention, the locations of variables on the stack can be shuffled in a linked binary application. FIG. 5 is a process flow diagram illustrating a method 500 of randomizing the locations of variables on the stack in a compiled and linked executable binary file (or binary) in accordance with one embodiment of the present invention. For example, in a Unix or Unix-like systems context, this binary may be in the executable and linkable format (ELF) and in a Microsoft® Windows® context, this binary may be in a portable executable (PE) format. In this embodiment, the shuffling operations occur after the linking operation 510, rather than before the linking operation 410 in the above-described embodiment directed toward randomizing the locations of variables during the build process.

Identification of variable locations on the stack after the build process in operation 504 is substantially similar to the technique used during the build process (in operation 404) because the same instructions are present in both the object code and the binary. In addition, the variable location randomization operation 506 is substantially similar to the corresponding technique used during the build process (in operation 406).

In this embodiment, in operation 508, the binary (rather than the object code) is updated with the new variable locations. The instructions are the same in both cases, and the contents will be written are the same. This is because the binary (or any section inside the binary) will not change in size because only the offset values (the offsets relative to the frame pointer) are being replaced and no data is added. According to this embodiment, a new (or a replacement) binary is generated in which the locations of the variables are shuffled from their locations in the original binary. According to one embodiment, this process is implemented by a computer program that takes a binary as input and that outputs a modified binary in which the locations of the variables in one or more of the functions are shuffled.

Figure 6:
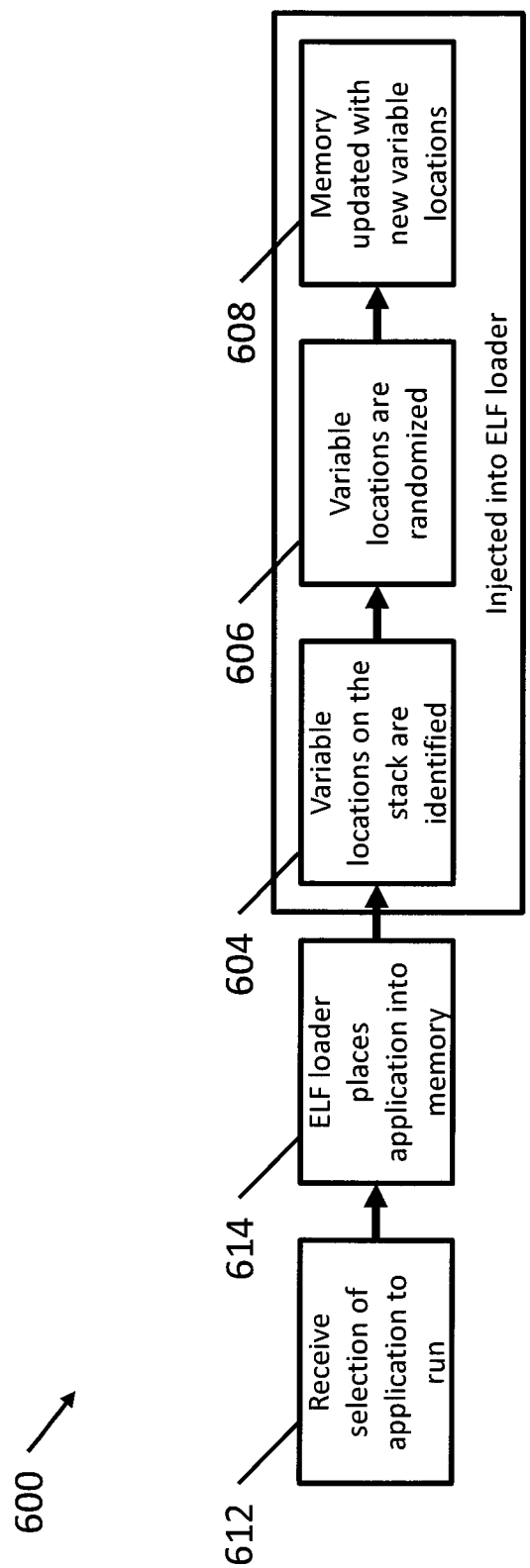
FIG. 6 is a process flow diagram illustrating a method of randomizing the locations of variables on the stack after a compiled and linked executable binary file (or binary) is loaded into memory for execution in accordance with one embodiment of the present invention.

According to another embodiment of the present invention, the locations of variables on the stack are randomized on application load (when the application is loaded to be run). FIG. 6 is a process flow diagram illustrating a method 600 of randomizing the locations of variables on the stack after a compiled and linked executable binary file (or binary) is loaded into memory for execution in accordance with one embodiment of the present invention.

Identification of variable locations on the stack after the build process in operation 604 is substantially similar to the technique used during the build process (in operation 404) and the technique used after the build process (in operation 504) because the same instructions are present in both the object code and the binary loaded into memory. In addition, the variable location randomization operation 606 is substantially similar to the corresponding technique used during the build process (in operation 406) and after the build process (in operation 506).

In this embodiment, after the locations of the variables are identified in operation 604 and the locations of the variables are randomized in operation 606, the code in memory is updated in operation 608 (in contrast to the code in the binary on disk being updated in operation 508 of the embodiment in method 500). Apart from this difference, this embodiment is substantially similar to the embodiment in which the binary file is modified.

In this embodiment, because the variable locations are randomized each time the application is loaded into memory, each separate run of the application results in a different shuffling (or randomization) of the locations of the variables on the stack, thereby further increasing the diversity of the system. According to one embodiment, this process is implemented by an executable loader (e.g., ELF loader such as 'execve' in Linux) that is configured to modify the binary code while the application is being loaded into memory or after the application is loaded into memory. Some embodiments of the present invention implement this with a modified loader at the operating system level.

Figure 7:
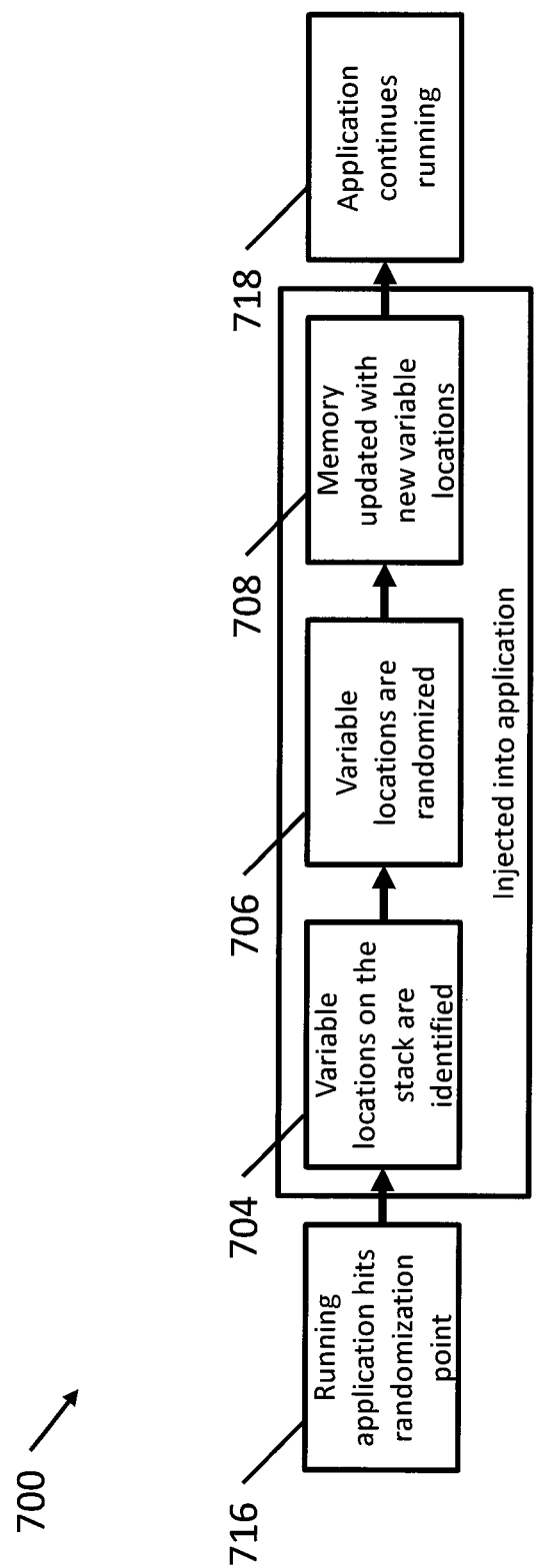
FIG. 7 is a process flow diagram illustrating a method of randomizing the locations of variables on the stack during execution in accordance with one embodiment of the present invention.

According to another embodiment of the present invention, a running application randomizes the locations of variables on the stack during execution. FIG. 7 is a process flow diagram illustrating a method 700 of randomizing the locations of variables on the stack during execution in accordance with one embodiment of the present invention.

In this embodiment, the binary application itself includes code to perform the randomization of the variables throughout its own code in memory. This randomization code can be called during execution at "randomization points," which can be triggered based on a timer or when execution reaches a particular state. This embodiment is substantially similar to the randomization process that takes place during application load, but differs in that the randomization code is built into the application rather than a component of the loader process.

In one embodiment, the randomization code can be automatically inserted into the application by using a modified compiler. In some embodiments, the modified compiler may be created by patching an existing compiler. In another embodiment, the randomization code can be incorporated into an application by incorporating a library for randomizing the stack locations into the program. In still another embodiment the randomization code can be incorporated into an application by running a macro on or including a macro in the source code of the application.

In some embodiments of the present invention, the randomization code is provided in a modified application virtual machine (e.g., Java® Virtual Machine, Low Level Virtual Machine, Python, Ruby, Common Language Infrastructure Virtual Execution System, or Mono™ Code Execution Engine). According to one such embodiment, the randomization process is performed on compiled bytecode loaded into memory by the application virtual machine.

Embodiments of the present invention may impose some upfront performance cost at load time due to the shuffling process, but would cause no performance impact during operation. In addition, embodiments of the present invention can work in concert with other stack security schemes such as stack canaries (see, e.g., Cowan et al., above) without requiring additional space on the stack. In addition, embodiments of the present invention do not require or depend on any OS-specific features such as address space layout randomization (ASLR), and can run on "bare-metal." Furthermore, embodiments of the present invention provide finer-grained approach than ASLR, thereby increasing the likelihood that the technique will be compatible with older ("legacy") software, While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A computer implemented method of randomizing locations of variables in a stack associated with a software application, prior to said randomizing locations, the stack including, in order from a bottom of the stack to a top of the stack, a return address for a function call, a local variable and an attackable buffer, the method comprising:
   identifying, by one or more processors, a local function in the software application;
   identifying, by the one or more processors, a plurality of stack locations of a plurality of variables in the identified local function;
   identifying, by the one or more processors, references to each of the plurality of variables in the identified local function;
   shuffling, by an executable loader that loads the software application, the stack locations of the variables to produce shuffled stack locations of the variables, each time that the software application is loaded into a memory, wherein each execution of the software program results in a different shuffling, wherein said shuffled stack locations of the variables changes a critical stack distance between the return address for the local function and the attackable buffer, and wherein the critical stack distance is a sum of a size of the local variable and a size of the attackable buffer; and
updating the stack locations of the variables with the shuffled stack locations.

2. The method of claim 1, wherein the identifying the stack locations comprises identifying variables in object code, and
wherein the updating the stack locations of the variables comprises updating the object code with the shuffled stack locations.

3. The method of claim 1, wherein the identifying the stack locations comprises identifying variables in binary code, and
wherein the updating the stack locations of the variables comprises updating the binary code with the shuffled stack locations.

4. The method of claim 1, wherein the identifying the stack locations comprises identifying variables in executable code loaded into memory, and
wherein the updating the stack locations of the variables comprises updating the executable code loaded into memory with the shuffled stack locations.

5. The method of claim 4, wherein the shuffling the stack locations of the variables to produce shuffled stack locations and the updating the stack locations of the variables with the shuffled stack locations occur prior to execution of the executable code.

6. The method of claim 4, wherein the shuffling the stack locations of the variables to produce shuffled stack locations and the updating the stack locations of the variables with the shuffled stack locations occur during execution of the executable code.

7. A non-transitory computer readable medium embodying program instructions for execution by a data processing apparatus for randomizing locations of variables in a stack associated with a software application, prior to said randomizing locations, the stack including, in order from a bottom of the stack to a top of the stack, a return address for a function call, a local variable and an attackable buffer, the program instructions adapting the data processing apparatus for:
identifying, by one or more processors, a local function in the software application;
identifying, by the one or more processors, a plurality of stack locations of a plurality of variables in the identified local function;
identifying, by the one or more processors, references to each of the plurality of variables in the identified local function;
shuffling, by an executable loader that loads the software application, the stack locations of the variables to produce shuffled stack locations of the variables, each time that the software application is loaded into a memory, wherein each execution of the software program results in a different shuffling, aid wherein said shuffled stack locations of the variables changes a critical stack distance between the return address for the local function and the attackable buffer, and wherein the critical stack distance is a sum of a size of the local variable and a size of the attackable buffer; and
updating the stack locations of the variables with the shuffled stack locations.

8. The non-transitory computer readable medium of claim 7, wherein the identifying the stack locations comprises identifying variables in object code, and
wherein the updating the stack locations of the variables comprises updating the object code with the shuffled stack locations.

9. The non-transitory computer readable medium of claim 7, wherein the identifying the stack locations comprises identifying variables in binary code, and
wherein the updating the stack locations of the variables comprises updating the binary code with the shuffled stack locations.

10. The non-transitory computer readable medium of claim 7, wherein the identifying the stack locations comprises identifying variables in executable code loaded into memory, and
wherein the updating the stack locations of the variables comprises updating the executable code loaded into memory with the shuffled stack locations.

11. The non-transitory computer readable medium of claim 10, wherein the shuffling the stack locations of the variables to produce shuffled stack locations and the updating the stack locations of the variables with the shuffled stack locations occur prior to execution of the executable code.

12. The non-transitory computer readable medium of claim 10, wherein the shuffling the stack locations of the variables to produce shuffled stack locations and the updating the stack locations of the variables with the shuffled stack locations occur during execution of the executable code.

13. A computer system for randomizing locations of variables in a stack associated with a software application, prior to said randomizing locations, the stack including, in order from a bottom of the stack to a top of the stack, a return address for a function call, a local variable and an attackable buffer, comprising:
a processor; and
memory storing program instructions, the program instructions being configured to control the computer system to:
identify, by the processor, a local function in the software application;
identify, by the processor, a plurality of stack locations of a plurality of variables in the identified local function;
identify, by the processor, references to each of the plurality of variables in the identified local function;
shuffle, by an executable loader that loads the software application, the stack locations of the variables to produce shuffled stack locations of the variables, each time that the software application is loaded into the memory, wherein each execution of the software program results in a different shuffling, wherein said shuffled stack locations of the variables changes a critical stack distance between the return address for the local function and the attackable buffer, and wherein the critical stack distance is a sum of a size of the local variable and a size of the attackable buffer; and
update the stack locations of the variables with the shuffled stack locations.

14. The computer system of claim 13, wherein the identifying the stack locations comprises identifying variables in object code, and
wherein the updating the stack locations of the variables comprises updating the object code with the shuffled stack locations.

15. The computer system of claim 13, wherein the identifying the stack locations comprises identifying variables in binary code, and wherein the updating the stack locations of the variables comprises updating the binary code with the shuffled stack locations.

16. The computer system of claim 13, wherein the identifying the stack locations comprises identifying variables in executable code loaded into memory, and
wherein the updating the stack locations of the variables comprises updating the executable code loaded into memory with the shuffled stack locations.

17. The computer system of claim 16, wherein the shuffling the stack locations of the variables to produce shuffled stack locations and the updating the stack locations of the variables with the shuffled stack locations occur prior to execution of the executable code.

18. The computer system of claim 16, wherein the shuffling the stack locations of the variables to produce shuffled stack locations and the updating the stack locations of the variables with the shuffled stack locations occur during execution of the executable code.

* * * * *